United States Patent [19]

Juettner et al.

[11] Patent Number: 5,615,333

[45] Date of Patent: Mar. 25, 1997

[54] INTEGRATION TESTING METHOD FOR OBJECT-ORIENTED SOFTWARE

[75] Inventors: Peter Juettner, Munich; Sebald Kolb, Ottobrunn; Peter Zimmerer, Munich; Udo Naumann, Unterhaching, all of Germany

[73] Assignee: Siemens Aktiengesellschaft, Munich, Germany

[21] Appl. No.: 438,846

[22] Filed: May 11, 1995

[30] Foreign Application Priority Data

May 11, 1994 [DE] Germany .......................... 44 16 704.0

[51] Int. Cl.$^6$ ..................................................... G06F 11/34
[52] U.S. Cl. ............................... 395/183.14; 364/267.91; 364/DIG. 1
[58] Field of Search .................... 395/183.01, 183.13, 395/183.14; 364/267.91, 275.5, 274.1

[56] References Cited

U.S. PATENT DOCUMENTS

| | | | |
|---|---|---|---|
| 4,595,981 | 6/1986 | Leung | 395/183.14 |
| 4,729,096 | 3/1988 | Larson . | |
| 4,819,233 | 4/1989 | Delucia et al. | 364/200 |
| 4,864,497 | 9/1989 | Lowry et al. | 364/200 |
| 4,864,569 | 9/1989 | DeLucia et al. | 395/183.14 |
| 5,301,325 | 4/1994 | Benson | 395/183.14 |
| 5,325,533 | 6/1994 | McInerney et al. | 364/200 |
| 5,357,452 | 10/1994 | Pio-di-Savoia et al. | 395/183.14 |
| 5,359,546 | 10/1994 | Hayes et al. | 395/183.14 |
| 5,371,747 | 12/1994 | Brooks et al. | 395/183.14 |
| 5,390,325 | 2/1995 | Miller | 395/700 |
| 5,426,648 | 6/1995 | Simamura | 395/183.14 |
| 5,475,843 | 12/1995 | Halviatti et al. | 364/200 |

OTHER PUBLICATIONS

Steve Cook, "Introduction to Object Technolgoie," OOP 1992 Conference Proceedings, SIGS Publications, New York, 1992.

*Primary Examiner*—Robert W. Beausoliel, Jr.
*Assistant Examiner*—Albert Décady
*Attorney, Agent, or Firm*—Hill, Steadman & Simpson

[57] ABSTRACT

A method for integration testing of all objects of an object-oriented program in which an analysis of its source code is first carried out in order to identify the mutual dependencies between objects and classes and, on the basis of these dependencies, those objects that have already been tested are allocated to a set of tested objects and, further, objects that are dependent only on these tested objects are also identified. These objects are tested and are subsequently added to the set of tested objects. When no object can be found that is dependent only on tested objects, those objects are sought that are dependent only on one additional, untested object. This untested object can then be replaced by an object stub for test purposes. The object thus tested is subsequently transferred into the set of tested objects. When objects are found that are dependent only on one another and form a cycle, then one of these is replaced by an object stub in order to be able to test the other. As a result, all objects of the object-oriented program to be tested are united in the set of tested objects and the entire program is tested.

31 Claims, 4 Drawing Sheets

FIG. 2 analysis

--- analyse the source code of the concrete application program and determine all dependencies and relationships between the single objects and classes;

↓ definitions:

standard types: = int,float,char,etc.;

tested classes: = all well tested classes, e.g. from class libraries;

define a set of tested objects; it may be empty or contain objects, built from reliable reused classes, e.g. from standard class libraries;

tested objects: = all objects of well tested classes, all variables of standard types;

execution iteration:

↓ determine all objects which

| either (subcase a)) | or (subcase b)) |
|---|---|
| are not already tested and use only standard types, tested classes, and tested objects;<br><br>("use" means here: use as a data attribute, use as a local variable in a method, use by a method call) (see case 1 a) below) | whose uses can only be tested together in one single test step (see case 1 b) and example 4 below); |

For continuation see FIG.3
▽

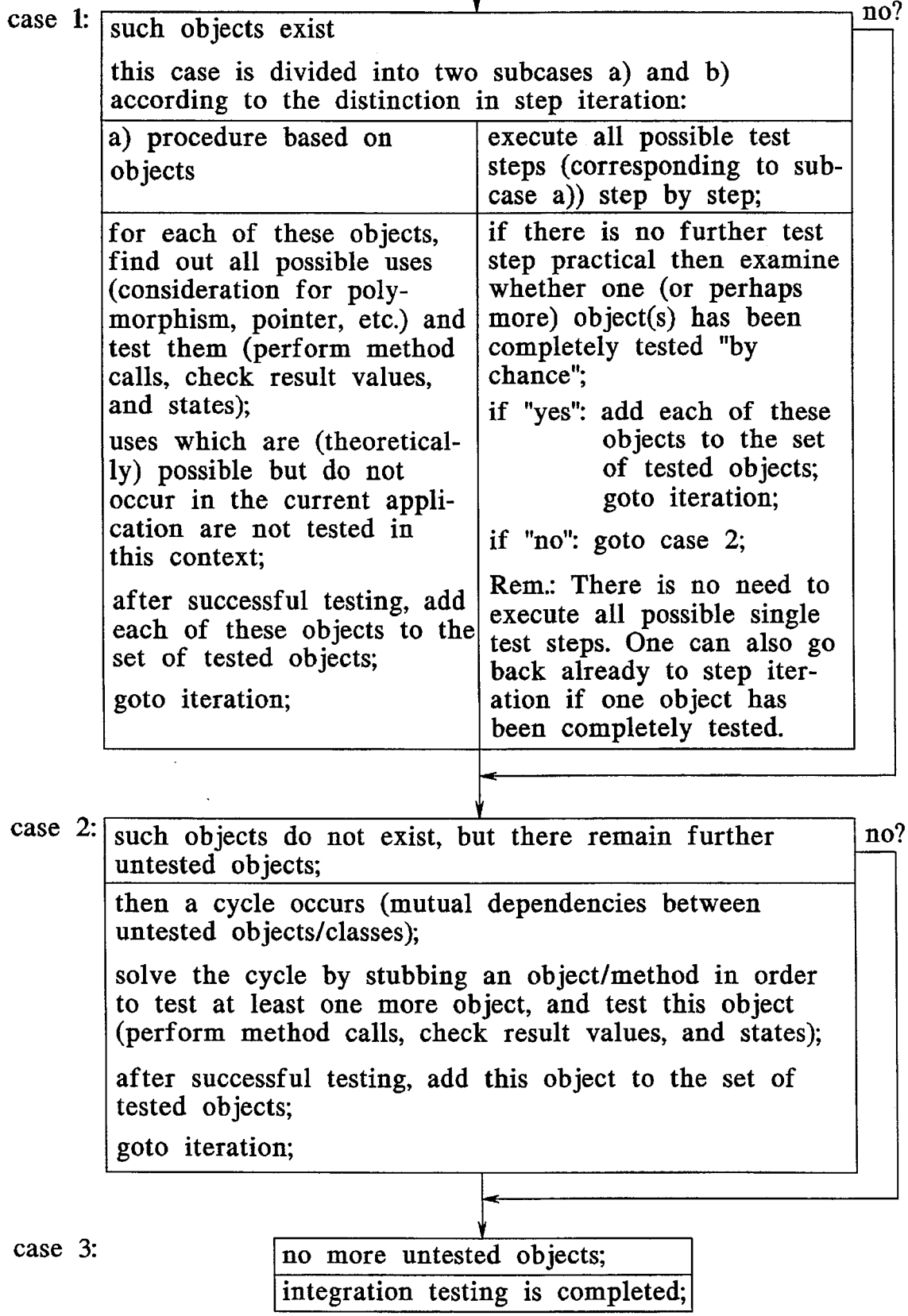

1

INTEGRATION TESTING METHOD FOR OBJECT-ORIENTED SOFTWARE

BACKGROUND OF THE INVENTION

The invention is directed to an automatically sequencing method for the integration testing of object-oriented software.

Object-oriented programming (OOP) is continually gaining wider acceptance and usage throughout the software industry because of its benefits to the process and products of software engineering. Testing, especially during the integration phase, is of major importance in the area of bigger projects.

In contrast to traditional software having a modular or, respectively, functional structure and shared global data connected via function calls and data flows, object-oriented software is composed of objects and classes connected via message exchange, inheritance and call/busy relationships. Overall, there are far more mutual "dependencies" (call, busy, data attributes, etc.) in object-oriented programs than in traditional software. Due to the encapsulation of data and functions in the classes, there is a tight linkage between the data relationships and the call relationships.

Further, the functionality of an object-oriented program is not realized in a hierarchy of functions organized top-down; on the contrary, it is distributed in a network of objects communicating with one another. As a result, the complexity and the flow logic in an object-oriented program is removed from the individual functions or, respectively, methods to the correct interplay between the methods. This is further intensified by the specific, object-oriented features such as, for instance, inheritance, polymorphism, dynamic linking, overloading and reimplementation.

A "stub" of a method is a substitute implementation for testing purposes that does not offer the full functionality of the method but enables a test run. The process of "stubbing" when testing object-oriented software is more complicated than in procedural programming. The reasons for this lie in the different architecture and structure of the object-oriented software, in the data encapsulation and in the many mutual dependencies between the individual objects or, respectively, classes.

A description of other fundamental technical terms of object-oriented programming and differences between traditional software and object-oriented software may be found in an article by Steve Cook, "Introduction to Object Technology," OOP '92, Conference Proceedings, SIGS Publications, New York, 1992, pp. 57–71, incorporated herein by reference.

Object-oriented programming is becoming more and more popular. Therefore it is important to address the influence of its specific characteristics on integration testing, which include inheritance, polymorphism and dynamic binding, encapsulation and information hiding, call/use relations, and object communication.

There has not yet been any explicit method for the integration of object-oriented programs and the integration test therefor and, consequently, there are no corresponding test tools available in the marketplace.

SUMMARY OF THE INVENTION

An object underlying the invention is to provide an automated method for the integration testing of an object-oriented program that avoids the need for stubs to the greatest extent possible, i.e., minimizes the need for stubs.

To that end, in an embodiment, the invention provides an integration test method for an object-oriented program comprising the following steps:

a) identifying mutual dependencies between at least two objects and/or classes by a source code analysis of a relationship structure of the object-oriented program;

b) allocating each tested object and/or each object from a tested class to a set of objects that have been tested;

c) identifying at least one object with the assistance of the relationship structure, the at least one object being dependent only on objects in the set of tested objects; and d) testing that object.

In an embodiment, the invention provides that a correct constructor is automatically identified for testing an object with the source code and with the relationship structure, the constructor serving the purpose of generating the object for the integration test.

In an embodiment, the invention provides that the object to be tested is automatically brought into a status as required for the integration test, being brought thereinto by a constructor call upon employment of the source code and by copying data components.

In an embodiment, the invention provides that a method call with which the object is tested is derived from the relationship structure for the testing of an object.

In an embodiment, the invention provides that when no object is identified that is dependent only on objects in the set of tested objects, that object that is additionally dependent on optimally few untested objects is identified and tested.

In an embodiment, the invention provides that an untested object is replaced by an object stub.

In an embodiment, the invention provides that at least one of those objects that, due to the relationship structure, are only dependent on one another and not on one or more objects in the set of tested objects is replaced by an object stub in order to test another.

In an embodiment, the invention provides that the method is repeated until an untested object is no longer present.

A particular advantage of the inventive method is that the dependencies of the individual classes and objects on one another can be found with a source code analysis of the object-oriented program and that these dependencies can be used in order to test those objects that are dependent only on objects or, respectively, classes that have already been tested. Beneficially, the inventive method also provides that, in case such objects are not found, then objects are tested that can only be dependent on one untested object and on further objects that have already been tested. It is thus assured that only few stubs need be separately programmed for testing.

The inventive method also advantageously provides that the correct constructor for an object is automatically identified for the automated testing with the source code and the relationship structure and that the object is generated therefrom.

As a result of the inventive method, the object is beneficially placed into the condition that is currently required for the integration test.

The inventive method advantageously provides that an object be tested by a method call which was derived from the relationship structure. The parameters employed for the object call derive from the source code program and from the current status of the object.

It is especially beneficial to identify those objects that form a cycle with one another, i.e. which are only dependent on one another and mutually call one another, from the relationship structure and to replace at least one of these objects with an object stub in order to be able to test the other. It can also result in a case-by-case basis that such an object only effects a method call in a further, untested object by punching through this object, so to speak, this method call referring to an object that has already been tested. This object initially identified as being untested can thus be directly marked as tested and be added to the set of those that have completed the test.

It is also advantageously provided in the method of the invention that objects that have not been tested and that are accessed be replaced by an object stub. Stubs represent a standard method for simulating object behavior and should therefore be programmed without excessive use.

It is advantageous to provide for reiteration of the procedure in order to thus ultimately implement a complete integration test for the object-oriented program. As a result, no untested objects would exist at the end of such a test.

These and other features of the invention are discussed in greater detail below in the following detailed description of the presently preferred embodiments with reference to the accompanying drawings.

BRIEF DESCRIPTION OF THE DRAWING

FIGS. 2 and 3 outline an object integration testing method in accordance with the invention.

DETAILED DESCRIPTION OF THE PRESENTLY PREFERRED EMBODIMENTS

Figure 1:
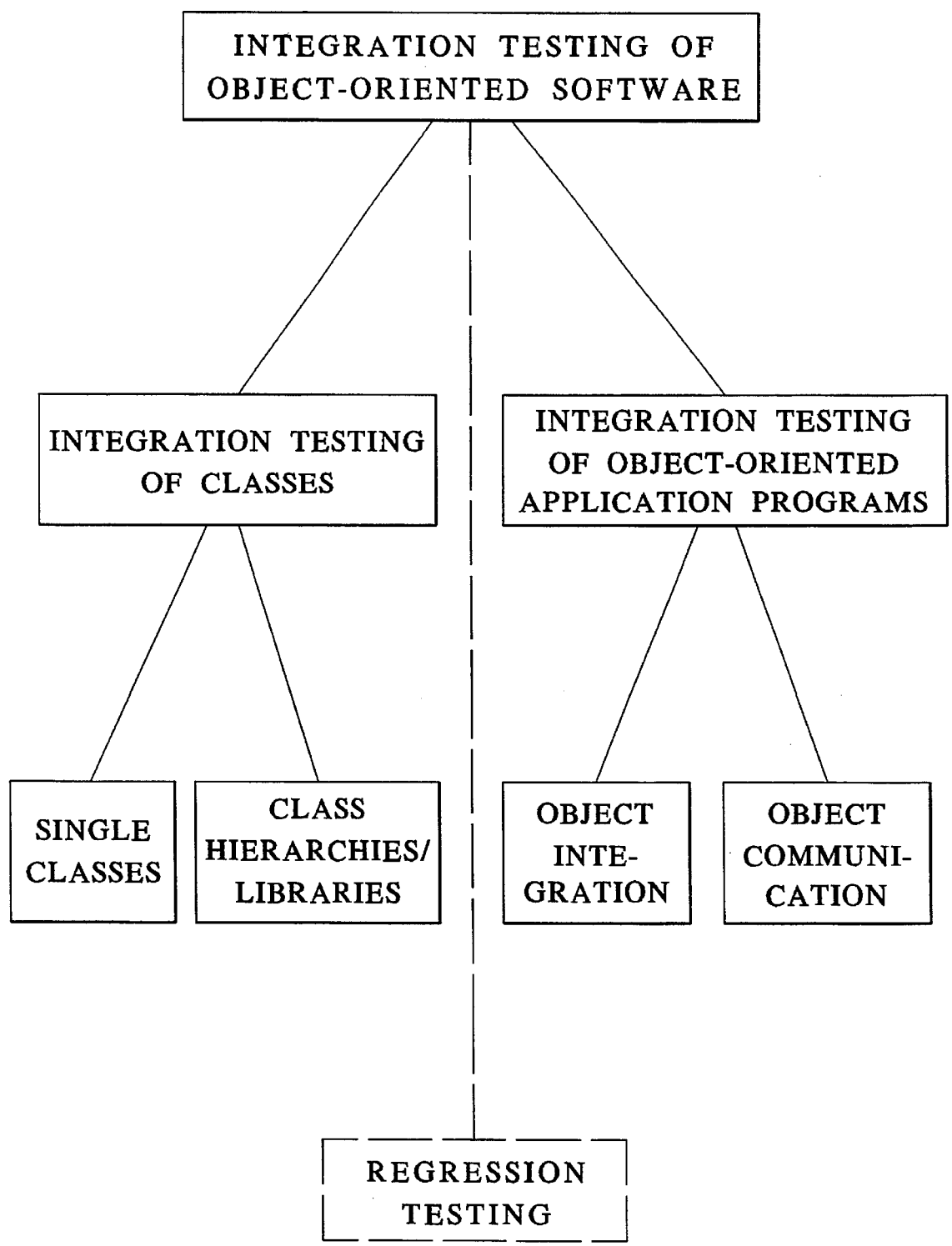
FIG. 1 illustrates aspects of objected-oriented integration testing.

As discussed above, the invention offers a method for computer-assisted integration of object-oriented programs and integration test therefor.

Integration testing involves testing the interactions between program parts during system integration. The process of integration testing becomes more difficult with the object-oriented paradigm due to features such as inheritance, call/use relations, communication through message passing, and reuse with class libraries. Due to the reuse of libraries, the main focus of testing shifts from unit to integration testing.

Integration testing of object-oriented programs is required for single classes, class libraries, and complete applications. The invention addresses the integration testing of classes, both as individual classes and as class hierarchies or libraries, and complete applications with respect to the integration of object instances and their communication behavior. It also addresses the regressive integration testing of iterative program modification.

Section 1 below identifies the issues which necessitate these new techniques. Section 2 defines strategies for integration testing of single classes and class hierarchies or libraries. Techniques for complete application programs are presented in Section 3. The influence of the object-oriented paradigm on regression testing, in the context of integrating iterative program modifications, is discussed in Section 4.

1. Characteristics of Object-Oriented Integration Testing

The process of integration of object-oriented software has some characteristics different from integration of conventional software. Whereas traditional procedural software consists of functional modules and common global data connected by function calls and data flow, object-oriented software consists of objects and classes connected by message passing, inheritance, and call/use relations. The different integration process leads to different integration testing.

The object-oriented paradigm does not support the prescription of control flow to the same degree as does conventional software for two reasons. First, the class concept of the object-oriented paradigm does not determine a priori an order in which the methods of the classes are called. To a large extent, methods of classes may be combined in an arbitrary order. Second, polymorphism and dynamic binding make it impossible to predict statically which methods are called in an object-oriented program.

Inheritance requires that a subclass be integrated into its base class(es), which leads to testing the interaction of subclass and inherited methods. The common assumption that code, successfully tested in a base class, does not need to be retested in the context of an inheriting subclass is incorrect. This assumption stems from the benefits of reuse, but these benefits do not automatically extend to testing.

A short example in C++ programming language (see D. E. Perry and G. E. Kaiser, "Adequate Testing and Object-Oriented Programming," Journal of Object-Oriented Programming, Vol. 2, pp. 13–19, January/February 1990) may show these problems.

---

Example 1:

```
class A {
    protected:
        int v;
    public:
        void set_state_A()   { v = 0; ... }
    ...
};
class B : public A {
    public:
        void set_state_B()   { v = 1: ... }
    ...
};
```
---

In this example, class A with method void set_state_A() and its subclass B with method void set_state_B() both set the state of the data member v. B does not replace the method set_state_A() but inherits it from class A. However, the necessity to retest the interaction of method set_state_A() with other methods in the context of class B (but with the same test data) is seen. One can suppose that all methods in class A assume that the instance variable v was already set to 0, in contrast to the methods in class B which demand that v was set to 1. The bug of conflicting assumptions about data member v would not be detected without retesting method set_state_A() in the context of class B.

This example shows a case in which inherited and not reimplemented methods must be retested in a subclass in order to provide a correct method interaction. However, redundant testing in base classes and subclasses should be avoided as much as possible, testing only what is necessary and sufficient, in order to achieve adequacy. Barbara Liskov and Jeannette M. Wing in "A New Definition of the Subtype Relation" in proceedings of ECOOP '93, pp. 118–141 present rather rigid criteria for subclasses, where even proofs of the correctness of base classes stay valid. For subclasses, which fulfill these criteria, retesting of the base class methods is not necessary.

Important features of OOP are encapsulation and information hiding. Although they improve the design and development processes, they make it easier for faults to hide during testing.

Class and integration testing are not as clearly separated in object-oriented environments as module and integration testing are in conventional environments. The structure of object-oriented software creates intensive relations and dependencies between different classes. The main relations are inheritance relations and call/use relations (calls, is part of, contains, friends, . . . ). This results in classes that contain/call/use other classes. Therefore, class testing for one single class often involves integration testing of its parts.

Furthermore, the object-oriented design process which specifies the object communication defines no conventional functional software split. The functionality of an object-oriented program is distributed in a network of communicating objects and not in a top-down organized hierarchy of functions. Therefore, a straightforward integration testing strategy cannot easily be derived from the relationships between method calls.

Simultaneously, the process of stubbing during testing object-oriented software is much more complex than in conventional programming. The most important reasons for this are the different structure and architecture (see above), data encapsulation (making it difficult to set the state of an object that must be stubbed), and mutual dependencies between classes (including mutual calling relations and inheritance). Stubbing cannot always be avoided, but it should be used as sparingly and carefully as possible.

OOP also encourages writing short methods (see N. Wilde and R. Huitt, "Maintenance Support for Object-Oriented Programs," IEEE Transactions on Software Engineering, Vol. 18, No. 12, pp. 1038–1044, December 1992), because short methods implementing atomic actions for objects are presumably more reusable. Application-specific uses combine these methods in an application-specific manner. Therefore, the complexity of an object-oriented program is shifted from the methods to the interaction of methods. This interaction becomes more powerful by dynamic binding, polymorphism, and reimplementation. Object-oriented programs have to be integrated and tested with respect to the communication relationships of their objects. For that, nontrivial program analysis and flexible testing and integration strategies are needed.

The integration testing process of object-oriented software must be examined precisely, and there are two scenarios of integration testing to consider in devising a strategy.

1. Integration testing in a class hierarchy/library (see section 2 below, "Integration Testing of Classes").

This process is independent of applications and mostly concerns developers of class libraries. It is important to test the interaction between all classes, even those which were not specifically written for working together in a current application. Using a class library, a programmer can combine classes and methods arbitrarily because there are no predefined objects or control flow.

2. Integration testing in a complete object-oriented application program (see section 3 below, "Integration Testing of Object-Oriented Application Programs").

This process is driven by the application and its objects. Only the features of a special application are to be tested, meaning the actually existing objects and method calls defined and used in the application program.

In practice, both processes of integration testing may be necessary for one single class or object. A class may be developed for a special application, but also with the intention to build a reusable component for future applications.

The strategy for integration testing of object-oriented software is described in the following sections 2 to 4. The different parts of the integration testing strategy are illustrated in FIG. 1. Regression testing does not directly belong to the integration testing strategy itself. But the main activity during regression testing (besides class testing) is to perform (parts of) integration testing again whenever necessary, because the modified part must be integrated into the unchanged part.

2. Integration Testing of Classes

Many object-oriented software systems are not application programs, but sets of classes. They allow the user to construct their own applications based on them. Typical examples are class libraries, not only for the well known abstract data types like sets, lists, etc., but also for application specific parts of programs like graphical user interfaces, file handling, real time, and parallel constructs. Testing such class hierarchies has to take into consideration that the concrete usage of the classes cannot be determined in advance. Therefore, the tests have to cover the possible correct applications of the classes as well as behavior in the case of incorrect usage. Such tests are necessary for all classes, for which reuse is intended, not only for class libraries. The tests should be carefully documented because test documentation can be used as a valuable description of the semantics of classes.

2.1. Integration Testing of One Single Class

Testing single classes is the first step towards testing an implementation. The functionality of a class is encoded in its methods. In C++, for example, these are constructors, destructors, member functions, friend functions, overloaded operators, and casts. Testing the methods of a class can be done using different black- and white-box techniques (see P. Juttner, S. Kolb, U. Naumann and P. Zimmerer, "A Complete Test Process in Object-Oriented Software Development," Quality Week, San Francisco, May 17–20, 1994). The traditional techniques of testing procedural programs can be applied with some technical modifications. Integration testing assumes that methods have already been unit tested. Nevertheless, already during the test of a single class a first integration test is necessary: The interactions of the methods of a class have to be tested.

Black-box testing the interactions of class methods is the minimum recommendation for covering the different possible applications of a reusable class. It covers the requirements from the point of view of a future usage of the class. It is a dynamic test of sequences of method calls checking the effects of a method call, namely result values and changes of state of concerned objects. Concerned objects are the object, where the method was called including its data components, associated objects, and objects at parameter position (recursively including their data components and associated objects). Associated objects of an object have names or addresses known by this object, for example via a pointer, that is a data component.

The principle of information hiding dictates that a class user has visibility only to class specifications and not to implementation. Black-box testing is therefore appropriate from the user viewpoint. An object is instantiated and any combination of two or more methods of this object (up to a reasonable and practical depth) is called. Method results, result parameters, and the states of the concerned object are checked after each of after selected calls, depending on the test purpose. Constructors, the destructor, and error handling of the class must be included in the test.

White-box data flow testing techniques can help reduce the number of method combinations. They can be adapted to develop test cases for method interactions. Each method is defined as an abstract single statement and it can be determined which data components of the class are written ("defined") or read ("used") by the method, similar to definition/use paris of conventional dataflow-based testing techniques (see T. J. Ostrand and E. J. Weyuker, "Data Flow-Based Test Adequacy Analysis for Languages with Pointers," Proceedings of the Symposium on Testing, Analysis, and Verification (TAV4), Victoria, British Columbia, October 1991). Method combinations can be selected in order to exercise as many definition/use pairs as possible. This technique can also be used to reduce the combinatorial explosion of the number of method combinations during the black-box test of interacting methods. For the following example 2, a sequence of method calls, which does not change an object state, can be reduced to the sequence of one single call.

Example 2:

```
       stack s;
       s.push (element);
       boolvar = s.isempty ();
       boolvar = s.isempty ();
is obviously equivalent to
       stack s;
       s.push (element);
       boolvar = s.isempty ();
```

If the tester is mainly interested in exercising as many different states of an object as possible, he may ignore all constant methods, i.e., the methods without definitions of data components. This approach is only useful if isolated tests of the constant functions were done with regard to all states.

For classes with many data members the analysis of their definitions and usages will sometimes result in sets of methods, which are only coupled by shared usages of data members, not definitions, i.e., methods of one set don't define data members, which are defined by methods of other sets and vice versa. The set of object states of such classes can be divided in disjunct parts, which also drastically reduces the complexity of testing method interactions.

These techniques should be supported by a tool which analyses the dependencies (definition/use) for the classes under test and generates test cases or test case schemes.

2.2. Integration Testing of Class Hierarchies/Libraries

Interaction of class methods is not limited to methods defined in the class but must also include inherited methods. A very important case is the test of interaction of inherited methods and subclass methods in combination. Additionally, classes from different inheritance trees can be designed and implemented using one another. Then the tests must also cover these call/use relations. Set forth below is a short example to show the problems for testing due to inheritance, polymorphism, and reimplementation.

Example 3:

```
class C {
    public:
        void M(C *obj)  { . . .; obj->N(); . . .; }
        virtual void N()  { . . . p};
    . . .
};
class D : public C {
    public:
        void N()  { . . .; };
};
main() {
    C *o1 = new C;
    C *o2 = new C;
    D *o3 = new D;
    o1->M(o2);// method M calls C::N
    o1->M(o3);// method M calls D::N
}
```

The critical issue in example 3 is that, due to dynamic binding, method M of class C calls C::N when given a parameter of class C and calls D::N when given a parameter of class D. Obviously M has to be tested in class D with different test data since the formulation and algorithm used by C::N and D::N are likely to be different in functionality as well as in structure. Moreover, it is necessary to retest M in C with parameters of type D*, because of the implicit change in the code performed due to these calls. In general, every call of M in all classes using C must be checked, whether a parameter of type D* is possible and retested if necessary. This example may appear a little artificial, but is not unlikely to occur in practice when C is an "old" class reused by creating a subclass D of it.

While integrating and testing class hierarchies, every method which can be called by anybody anywhere should be tested, regardless of specific uses in application. There are three important aspects to integration testing of classes in a hierarchy or library:

1. Interaction of methods within one single class (intraclass testing):

This part has already been described above in Section 2.1, "Integration Testing of One Single Class." Method interactions are tested by stubbing references and uses of classes not yet tested. The process of stubbing is much more difficult than in conventional programming, because the states of objects are encapsulated in their data attributes and stubs can also be inherited.

2. Interaction of methods of different classes (interclass testing):

The following two relationships must be considered simultaneously:

call/use relations (including aggregation)
   As in conventional programming, integration must be done in a top-down or bottom-up manner according to the call/use relations of classes. Usually stubbing cannot be avoided, but it should be used as infrequently as possible (because of the problems mentioned above).

inheritance relations
   After testing the base class, one has to test the new (and reimplemented) methods of the subclass, then the interaction of methods in the subclass, and finally the interaction with the base class(es). One must be careful to retest all possible uses of redefined methods, and all classes where redefined methods may be called in the class hierarchy or elsewhere due to polymorphism and dynamic binding (see Example 3 above). Inheritance of test cases often makes testing easier. Especially reimplemented methods should have unchanged semantics for the user of the subclass, such that the test cases for their black-box tests can be inherited from the base class by substituting subclass objects for base class objects. From the inheritance structure, a test case generation tool could derive new test cases for subclasses based on existing ones.

These relations overlap one another. The order of integrating and testing the classes must be determined from the relations in order to minimize stubbing. Additional information about the selection of test cases with regard to reuse and derivation is needed. This is often quite complex and difficult to obtain and should be supported by a tool. The tool analyzes the class hierarchy and dependencies between the classes and should supply the required information.

3. Integration test due to template relation:

Class templates are tested in one or, more frequently, multiple exemplary instantiations. Suppose one has a class template TC with one template argument type parameter. If the specific argument type is a class, such as class C, then all sorts of usage of this class C in the template TC must be tested before the template class TC<C> can be tested. For example, if TC is a container-class, one typically will have to test the constructors, the destructor, the assignment operator, and operators for comparison of an argument class C before testing TC<C>.

Aspects 1 and 2 and their effects on class testing are described more in detail in M. J. Harold, J. D. McGregor and K. J. Fitzpatrick, "Incremental Testing of Object-Oriented Class Structures," ACM, pp. 68–80, 1992, where an algorithm for testing class hierarchies is outlined. But the benefits of the algorithm can only be realized effectively with automated test case generation and execution. These aspects are to be applied according to the object-oriented software to be tested. A class should be reused without retesting only if it is well documented, well tested (also with regard to reuse), if the test itself is well documented, and if one has experience with the class. Furthermore, it must be checked whether the earlier tests cover the current usage. The subject of regression testing in class hierarchies is discussed in Section 4 below.

3. Integration Testing of Object-Oriented Application Programs

Integration testing of complete object-oriented application programs is a difficult task. The reasons for this are the independent structures resulting from inheritance, call/use relations, and data aggregation. In general, it is not possible to do integration testing according to only one of these structures without a lot of tedious stubbing. Therefore, a practical approach needs a flexible mixed strategy. Herein are presented two independent complementary strategies which can be used in combination to provide an appropriate and adequate integration testing. The first one, "object integration," is based on the source code of the program, and the second one, "object communication," exploits the object-oriented analysis and design (OOA/D).

3.1. Object Integration

The main difference of object integration from integration testing in a class hierarchy (see Section 2, "Integration Testing of Class Hierarchies/Libraries") is the strong focus on integrating and testing objects, not classes. Testing concentrates on a concrete application, not on reuse in future applications. Only those methods of objects of the object-oriented program are tested, which are really called with consideration for the special uses of the objects and the methods. Existing standard class libraries are supposed to be well tested and to supply correct objects. The integration is done with objects in a bottom-up manner, so that the objects increase in extent and in complexity. It starts with basic, low-level objects and ends with the high-level objects or the main function. The latest tested calls correspond to the requirements of the program. Sometimes stubbing cannot be avoided, but the integration technique tries to avoid it wherever possible.

The methods are tested only for their special use at the objects of the application program. For example, if there is a method call obj.m(5), then only one test case (call method m() at object obj with parameter value 5) is performed. Nevertheless, the different possible states of object obj must be taken into consideration for the test. However, if there is a method call obj.m(x) then many different test cases (call method m() at object obj with different parameter values for x) must be performed.

The exemplary embodiment of the inventive method discussed herein is composed of two components:

1. An analysis phase or part and
2. An execution phase or part.

The strategy/method of object integration in accordance with the invention is outlined in FIGS. 2 and 3.

In the analysis phase, the inventive method first implements an exact, static source code analysis of the object-oriented program to be integrated and identifies all dependencies and relationships between the individual objects or, respectively, classes. The information obtained in this way is required for the execution phase in which the step-by-step integration of the individual objects and the integration test are implemented (implementation of method calls, etc.). The procedure for integration is set forth below.

In the execution phase, all classes that can be assumed to have been tested serve as the starting point for the integration (for example, from standard libraries). All objects of such tested classes that occur in the program are defined as a "set of tested objects," and that definition is used throughout herein and in the claims. (This definition also includes anonymous objects, i.e. objects that are only accessible via a pointer, and objects that are implicitly or, respectively, temporarily generated by the compiler.)

A single test execution step is a method call at an object of the application program. This is done by creating an object in the same state as in the application program and calling the appropriate method for it. Setting the state of an object may be a non-trivial working step due to other objects that are referenced by pointers in the object under test. The state of this object is not only defined by the identity of these referenced objects, but also by their states, and so on. Good object-oriented design will try to keep such connections as small as possible. They complicate not only testing but also every sort of maintenance, because they propagate the impacts of software modifications in a sometimes confusing way. Therefore, they detract the benefits of information hiding and data encapsulation in object-oriented programming.

An object of the invention is to test as little as possible and only that which is necessary, but simultaneously to forget nothing required in the application program. All described actions in the strategy above require non-trivial analysis and testing work. Determining all uses of an object (see step "iteration" and "case 1" in the strategy in FIGS. 2 and 3) may be quite difficult, especially if pointers are used. Therefore, it should be supported by a tool, as well as the analysis phase. If using pointers, the static analysis possibly supplies many more object associations than actually occur during the program run. That does not mean that the program cannot be tested but perhaps much "unnecessary" testing effort, including stubbing must be done.

It is useful and saves time to keep in mind what already has been tested during class testing. Many test cases for the objects can be saved by making sure that analog test cases have been performed while testing their classes. For this purpose, test case management is necessary. This strategy enforces rather thorough testing and needs tool support for use in larger programs. If testing to such an extent is too expensive, it is still worth being done for the most critical parts of a program. In order to save testing costs, it also makes sense to concentrate object integration on the major application specific objects described in OOA/D. The numerous auxiliary objects of abstract data types (sets, ordered collections, etc.) used by this object should have been thoroughly validated during class testing. Fortunately, in most applications they can be built using pretested class libraries.

The integration method begins with the "set of tested objects" and it is understood that it potentially can be empty. The goal is the step-by-step enlargement of this set with tested objects until all objects of the program are covered.

In a first step, all the objects are automatically identified by the inventive method that have either not yet been tested and only use standard data types or objects that have already been tested (see below, first case, proceeding a)) or, on the other hand, whose uses/employments can only be tested in common in a testing step (for example, given o1.m (o2), o1 and o2 must certainly also be tested in common in a testing step) (see below, first case, proceeding b)). In this context, "used" denotes a data attribute, a local variable in a method or a parameter of a method call of this object.

Proceeding from this first step, a distinction is to be made, for example, between three cases:

1. There Are Such Objects.
2. There Are No Such Objects But There Are Still Untested Objects.
3. There Are No Longer Any Untested Objects.

First Case

There Are Such Objects (Case 1)

According to the above distinction between cases, this first case is divided into two procedures: a) Proceeding according to/based on objects (case 1a, FIG. 3), and b) Proceeding according to implementable/executable test steps (which always correspond to an object use) (case 1b, FIG. 3).

a) Proceeding According to Objects

In this proceeding (outlined as case 1a, FIG. 3), first all possible uses (taking polymorphism, pointers, etc., into consideration) are identified, for example, for each of these objects. The information required for this purpose is found by the inventive method in the source code analysis of the object-oriented program. Subsequently, all of these uses are tested, i.e. methods are called and the result values and statuses are checked. The advantage of this procedure is that no program parts need be "stubbed". The objects are thereby successively tested "bottom-up". An individual test step, for example, can comprise a method call to an object of the user program. To that end, the inventive method generates, for example, a new object and places this, insofar as possible, into the same status as an object of the user program (for example, via a constructor call or by copying the data components). Subsequently, the corresponding method call is implemented in the test environment generated by the inventive method (executive routine). Uses that are theoretically possible, but cannot occur in the specific application because of the static analysis, are not tested, for example, in this context because this context only concerns a test of a concrete user program. The intention of the method is to test exactly that (and no more and no less) which is required for the specific user program and to thereby specify an advantageous sequence with respect to the object integration that minimizes or, respectively, avoids the employment of the stubs.

After the successful testing, each such object is added to the set of all tested objects. The method is subsequently continued with, for example, the first step.

b) Proceeding According to Implementable Test Steps (that, for example, respectively correspond to an object use).

This procedure (outlined as case 1b, FIG. 3) is more precisely oriented to the implementable/executable test steps than in the proceeding according to objects.

First, all possible test steps (corresponding to the proceeding according to objects) are successively executed until no further steps are possible. The set of executed and executable test steps thereby increases with each of the executed test steps (or remains of the same size) since every executed test step potentially in turn enables further test steps.

At the end, i.e. when no further test steps are possible, a check is made to see whether one or, potentially, a plurality of subjects were entirely tested.

If one or, potentially, a plurality of subjects were entirely tested, then every such object is added to the set of all tested objects. The method then continues with the first step.

When no object was entirely tested and no further test steps are possible, then the method continues with the second case.

As an alternative to proceeding according to implementable test steps, one need not necessarily test until no test step is possible; rather, one can continue with the first step when an object has been entirely tested.

Second Case

There Are No Such Objects But There Are Still Untested Objects

In this case, a cycle has appeared, i.e. there is a mutual dependency between as yet untested objects.

The cycle is resolved, for example, by stubbing an object use in order to be able to test at least one further object. This object is then tested, i.e. methods are called in, for example, and result values and statuses are checked.

This reveals an advantage of the method: stubbing is only carried out when it is absolutely necessary; otherwise, it is avoided.

After the successful testing, this object is added to the set of all tested objects. The method is continued with the first step.

Third Case

There Are No Longer Any Untested Objects

In this case, the integration test has thus been completed and is ended.

Thus, the method for the integration and for the integration test of objects in object-oriented programs is composed, for example, of the following parts and executive sequences:

1. Analysis phase: analyze the source code of the specific user program and identify all dependencies and relationships between the individual objects and classes;

Definitions:

Standard types:=int, float, char, etc.;

Tested classes:=all classes from class libraries (already successfully tested or standard class libraries), and all classes that have already been successfully tested;

Set of tested objects=it can be empty or contain objects of tested classes:

Tested objects:=all objects of classes already tested, all variables of standard types;

2. Executive routine: integrate and test

Start: define all objects that have either not yet been tested and that use only standard types, tested objects or classes ("use" here means: use as data attribute, as local variable in a method, as parameter in a method call given this object) (see above, first case, proceeding a)). Or, on the other hand, whose uses/employments can only be tested in a common single test step (for example, given o1.m(o2), for example, o1 and o2 must surely be tested in common in a testing step) (see first case b));

First Case

There Are Such Objects

This case is divided into the two proceedings or procedures, a) and b), described above and illustrated in FIG. 3.

a) Proceeding according to objects

1. Define all possible uses for each of these objects (taking polymorphism, pointers, etc.) into consideration) and test these (call methods in, check result values and statuses); uses that are theoretically possible but that do not occur in this specific use are not tested in this context.
   2. After successful testing, add each such object to the set of tested subjects.
   3. Return to start.

b) Proceeding according to implementable/executable test steps (that respectively correspond to an object use)

1. Successively implement/execute all possible test steps (corresponding to proceeding a)).
   2. When no further test steps are practical, then check whether one object (or, potentially, a plurality of objects) has (have) been entirely tested.
   3. When "yes" (i.e., an object has been entirely tested), then add each such object to the set of tested objects and return to start.
   4. When "no" (i.e., an object has not been entirely tested), go to second case; alternative to b): of course, one need not absolutely test until a test step is no longer possible but can already go to start when an object was entirely tested.

Second Case

There Are No Such Objects But There Are Still Untested Objects

In this case, a cycle has occurred (mutual dependency between untested objects/classes).

1. Resolve the cycle by stubbing an object/method in order to be able to test at least one further object and test this object (call method in, check result values and statuses).
2. After successful testing, add this object to the set of tested objects.
3. Return to start.

Third Case

There Are No Longer Any Untested Objects

The integration test is complete and is ended.

The following shows an Example 4 for the object-oriented language C++, which is intended to illustrate the operation of the inventive method:

Example 4:

```
class c3
{ private:

float r;
public:
    int c3_m1()
    { if (r > 0)

return (0);
        else return (1);
    }
    c3()
    { r = 17; }
    c3 (float z)
    { r = z * z; };
};

class c2
{ private:

int i;
    public:
    void c2_m1 (c3 p)
    { if (p.c3 m1())

i = 10;
        else i = 7;
    };
    void c2_m2(int k)
    { i = k;

}
    c2()
    { i = 100;

};
};

class c1
{ private: c2 a;

public
    void c1_m1(c3 p)
    { a.c2_m1(p);

a.c2_m2(5);
    }
} main ()
{ c1 o1;

c3 o2;
    c3 o3 (5);
    o1.c1_m1 (o2)
    o1.c1_m1 (10.0);
}
```

MGT: = set of tested objects
MGT: = { }

The following iteration steps are recited as an example (the following division into the individual steps is partially flexible):

1) Identify all objects that have not yet been tested that only use objects from the set MGT or standard types
   Programmer-Defined Objects:
   o2, o3 in main () (o1 of class c1 cannot yet be tested!)
   Use of o2:
      call-in of the parameter-less constructor of c3 in line 44
      use as "right side" in copy constructor generated by the compiler in line 46 (via to1, see step 2 below); need not be tested since compiler-generated)
   Use of o3:
      call-in of the parameterized constructor of c3 in line 45→ generated test cases:
      test of the parameter-less constructor of c3
      test of the parameterized constructor of c3 with parameter 5 (including cast of int on float)
   o2 and o3 have thus been tested.

MGT:=MGT+{o2, o3 }

2) Identify objects not yet tested that only use objects from MGT or standard types; test continuation with the subjects that are required in line 46 is the aim.
   Programmer-Defined Objects:
      Private object a of c2 in class c1 with parameter-less constructor (o1 of class c1 cannot yet be tested!)
   Compiler-Generated Objects:
      Temporary object to1 of class c3 at parameter position in line 46 generated by compiler-generated copy constructor
   Use of to1:
      call-in of the compiler-generated copy constructor with o2 as right side (need not be tested since compiler-generated)
      further use only together with a (in the strategy of the first case, proceeding b))
   Use of a:
      call-in of the parameter-less constructor of c2 in line 34
      further use only together with to1 (in the strategy of the first case, proceeding b))
   Use of to1 and a (in the strategy of the first case proceeding b)):
      a.c2_m1(to1) in line 37
   Further Use of a:
      a.c2_m2(5) in line 38→ Generated test cases:
      test of the parameter-less constructor of c2 for a
      test of a.c2_m1(to1) with to1 already tested
      test of a.c1_m1(5)

MGT:=MGT +{to1, inclusive a}

3) Identification of objects not yet tested that only use objects from MGT or standard types
   Programmer-Defined Objects:
      Private object a of c2 in c1 with parameter-less constructor
   Compiler-Generated Objects:
      Temporary object to2 of the class c3 at parameter position in line 47 generated with parameterized constructor c3(float z)
   Use of to2
      call-in of the parameterized constructor c3(float z) with 10.0 as constant parameter value
      further use only together with a (in the strategy of the first case proceeding b))
   Use of a:
      introduce a from step 2)!
      further use only together with to2 (in the strategy of the first case, proceeding b))
   Use of to2 and a (in the strategy of the first case, proceeding b)):
      a.c2_m1(to2) in line 37
   Further Use of a
      a.c2_m2(5) in line 38 →Generated Test Cases:
      test of the parameterized constructor c3(float z) with z=10.0
      test of a.c2_m1(to2) with to2 already tested and "old" a
      test of a.c1_m1(5)

MGT:=MGT +{to2 inclusive a}

4) Identification of objects not yet tested that only use the objects from MGT or standard types
   Programmer-Defined Objects:
      o1
   Compiler-Generated Objects:
      no longer any (all already tested)
   Use of o1:
      call-in of the parameter-less, compiler-generated constructor of c1 in line 43
      call-in of the method c1_m1(o2) in line 46
      call-in of the method c1_m1(10.0) in line 47 Note: the further objects thereby occurring were already tested for the respective uses → Generated Test Cases:
      test of the method c1_m1(o2)
      test of the method c1_m1(10.0)

MGT:=MGT +{o1}

All objects from main {} have thus been tested.

The following Example 5 shows two objects a and b of classes aclass and bclass, respectively, which correspond to case 1b) of the integration algorithm. In lines 4 and 5 none of the objects is testable in isolation (according to case 1a)), because a is using b and b is using a. Nevertheless, it is obvious (by detailed code analysis) that the usages of line 4 and line 5 can be tested, because a.m1(b) does not change b and b.m2(a) does not change a. Afterwards both objects a and b can be added to the set of tested objects.

Example 5:

(Objects mutually testable in single test steps)

```
class aclass {                          class bclass {
public:                                 private: int icomp;
int my (void) const{...};               public;
void m1 (bclass bpar)                   void m2 (aclass apar)
{...bpar.mx(5)....}                     {...icomp = apar.my();...};
...                                     void mx(int i) const{...};
...                                     ...
};                                      };
  //in another scope:
  {                                     /*line 1*/
  aclass a;                             /*line 2*/
  bclass b;                             /*line 3*/
  a.m1(b);                              /*line 4*/
  b.m2(a);                              /*line 5*/
  //other statements without a or b
  }
```

Figure 4:
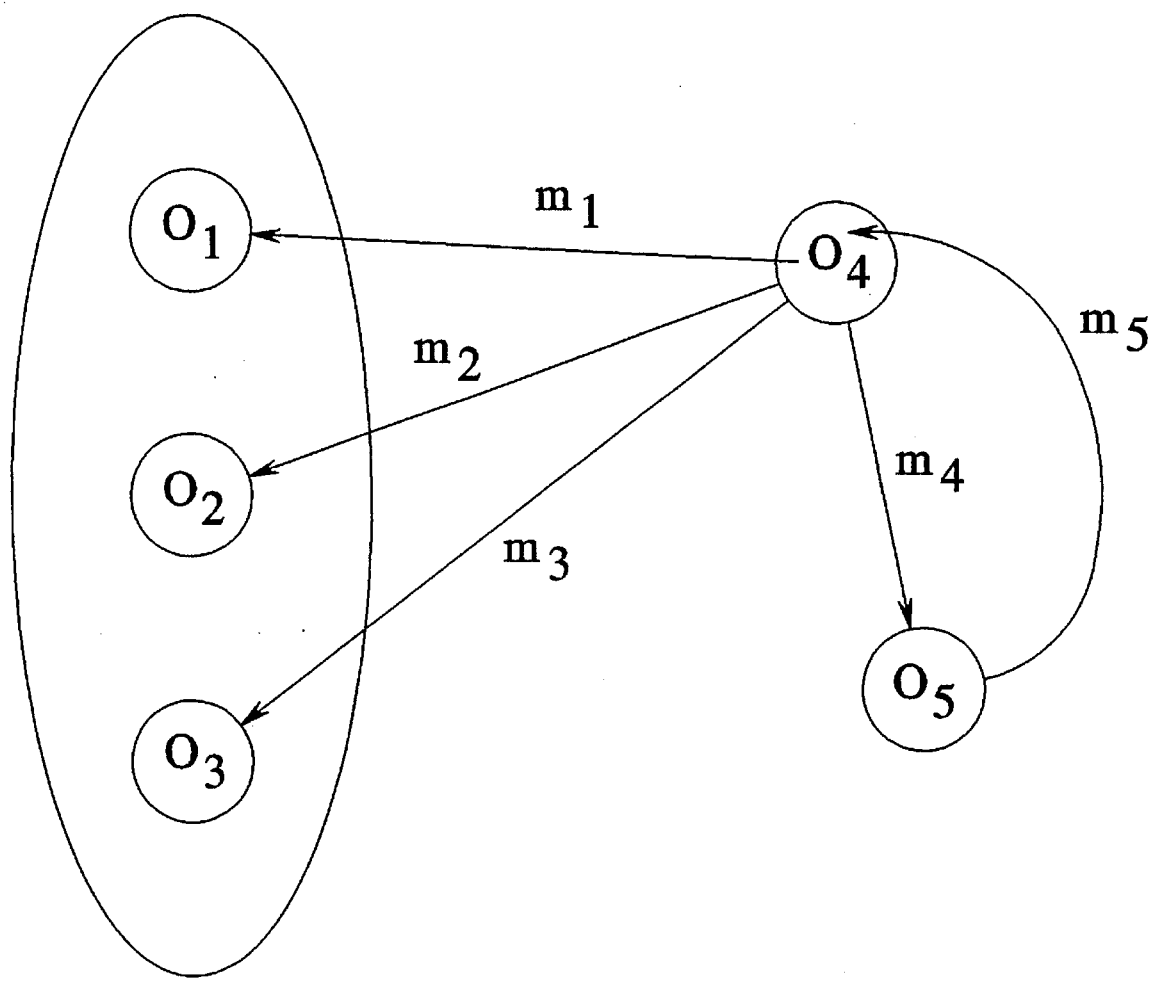
FIG. 4 illustrates results of testing in accordance with the invention.

FIG. 4 shows an example of use of the inventive method.

In FIG. 4, objects $O_1$, $O_2$ and $O_3$ have already been tested and the objects $O_4$ and $O_5$ have not been tested. $O_4$ uses $O_1$, $O_2$ and $O_3$. $O_4$ and $O_5$ mutually use each other, i.e. a stub would be necessary according to pure integration according to objects.

Given a more exact, automatic analysis of the dependency on the basis of the inventive method, it follows that the call of $m_5$ to $O_4$ has only resulted in a call of $m_1$ to $O_1$ (this can be considered tested). An integration sequence without a stub thus derives: the test the call of $m_5$ to $O_4$. Subsequently, $O_5$ is testable since no further untested calls proceed from $O_5$. After the test of $O_5$, this can be added to the set of tested objects. After this, $O_4$ can also be tested.

3.2. Object Communication

Testing the communication of objects in an application program is an important part of integration testing. The object communication of an object-oriented program is defined as a sequence of single communication steps during program execution. A single communication step is a method call to an object in the program. This includes explicit and implicit calls (for example, constructor and destructor calls). Object communication in an object-oriented program is one of the main results of the OOA/D. For convenience, the nomenclature of J. Rumbaugh, M. Blaha, W. Premerlani, F. Eddy and W. Lorensen, "Object-Oriented Modeling and Design," Prentice-Hall International, Englewood Cliffs, N.J. 1991 is used here for the technical jargon of OOA/D.

As a starting point, a correct OOA/D is assumed as a given condition. Testing the OOA/D itself is not discussed herein. Then the execution of the object-oriented program is tested against the results of the design. If it behaves as specified in the design, the program is accepted as correct. This is a technique of integration testing of an object-oriented program which is independent to the specific object integration described in the preceding section. Here, no stepwise testing with growing objects is done, but the complete program is used. If only parts of a complete program shall be tested, it is necessary to build a test harness which stimulates the program parts under test.

Testing the object communication is a more global approach to a program and allows less thorough testing than object integration, which may be a valuable feature to real world projects under time pressure. Apart from that, the chance of testing the application in two independent ways is one of the main benefits of the work spent in a detailed OOA/D. Testing the object communication is subsumed under integration testing because the object communication connects the different parts of an object-oriented program.

During program execution a test log can be written which contains all the necessary information about object communication. The test log may be in a graphical notation which is used in OOA/D. Afterwards, the correct transfer from object-oriented design to code can be verified by comparing the test log with the object-oriented design data. For this purpose, several test views of the object communication are useful. It is recommended that first the validation of the dynamic parts of the "object-model" by evaluation of constructor and destructor calls of the program run be undertaken. The next step is the validation of object communication in the narrower sense. In OOA/D, method sequences to specific program inputs are designed ("dynamic model"). These sequences can be validated by processing of the occurred communication during a corresponding test run of the program. This can also be seen as testing "use-cases" (see Ivar Jacobson, Magnus Christerson, Patrik Jonsson, Gunnar Övergaard: "Object-Oriented Software Engineering: A Use Case Driven Approach." The "functional model" can also be at least partly validated by logging the parameters of method calls.

In addition to the validation of different OOA/D models, some dynamic metrics of program executions can be derived. For example:
- for classes: number of instantiated objects, number of anonymous objects and objects with a name, number of called methods, number of temporarily instantiated objects, number of constructor and destructor calls,
- for methods: number of calls, and
- for objects: number of called methods at this object, use history (sequence of called methods, starting with the constructor and ending with the destructor call).

Anomalies or unexpected metric results give hints to program parts where faults could be hidden and further testing should be concentrated.

Of course, all of these statistics and the visualizations of object communication can only be done by a powerful test tool. The statistics and communication logs can also be used for checking whether class testing has been done to a sufficient extent. The method calls at the distinct object states should have occurred during class testing. Accordingly, it can be checked whether all needed sequences of method calls to objects of one class occurred during integration during integration testing of its class (see Section 2.1, "Integration Testing of One Single Class").

For testing parallel and real-time software, time intervals between different method calls, between the call, the execution, and the end of one method can be measured. Normal instrumentation techniques cannot be used in this context because they change the time behavior of the software under test. Therefore, a log has to be done in the run-time system, the test activities have to be done exclusively, and the system clock has to be halted meanwhile. In general, this log collects data of asynchronous method calls, and testing will be restricted to the real-time aspects and the semantics expressed in these method calls.

Testing object communication can be viewed as white-box testing of a complete program at a high level. If object communication is considered during testing program functionality against requirements, this is a white-box approach. White-box techniques for procedural-based testing can be mapped onto the OOA/D: an object-oriented program corresponds to a single procedure, its objects correspond to normal variables, and method calls correspond to executable statements. From this viewpoint, testing object communication is positioned between object integration (see Object Integration) and system testing.

4. Regression Testing

Regression testing is the testing of modified software previously tested. The iterative nature of object-oriented software development necessitates regressive integration testing of classes and applications. Modifications to them, whether due to error corrections, adaptations, or new requirements, must be retested at class-, integration-, and system-level. Regression testing is done to ensure that modified software behaves as specified in both its modified and unmodified components, scaling up from single classes to complete object-oriented systems.

Regression testing generally requires no new techniques. Thorough test case management is required, in part because minor modifications can require rerunning a very large number of test cases. For example, when an error is corrected, the propagating influence of the modification due to inheritance and call/use relations must be determined, and this can be quite extensive. The tester is forced to do some sort of analysis of propagation and inheritance of changes in the class hierarchy or rather in the application program.

Modifications to the software can be tested in the same way that new software is tested. Unchanged code is often easier to test, because the earlier version of the software may act as an oracle. However, it is difficult in integration testing to determine which parts must be retested and how to do it. In addition to new test cases, as many as possible of the existing test cases should be reused. Therefore, analysis of the program and dependencies between its classes, objects, and methods must be undertaken, in order to determine what parts need to be retested.

Regression testing is expensive for software with poor encapsulation and many interconnections. Encapsulation and information hiding in a class reduces the cost of regression testing. In a well-designed OO program, changes to class methods only have an effect through their external interfaces. Regression testing of the clients of a class can, therefore, be restricted to black-box testing the method interface. Inheritance, however, introduces a lot of interconnections, reduces information hiding, and complicates regression testing. Modifications to a base class can affect all subclasses, even unchanged subclasses (see example 3).

Although modifications and changes may be suggested by those skilled in the art, it is the intention of the inventors to embody within the patent warranted hereon all changes and modifications as reasonably and properly come within the scope of their contribution to the art.

We claim:

1. An integration test method for an object-oriented computer program comprising the following steps:
   a) conducting a source code analysis of a structural relationship between objects in the object-oriented program;
   b) identifying mutual dependencies between at least two objects and/or object classes by way of the source code analysis of the structural relationships of the object-oriented program;
   c) allocating a tested object and/or an object derived from a tested class to a set of tested objects; and
   d) identifying at least one object with the assistance of the structural relationship of the source code, said at least one object being dependent only on objects of the set of tested objects; and
   e) testing uses of said object.

2. The method according to claim 1, whereby a correct constructor is automatically identified for testing an object with the source code and with the relationship structure, said constructor serving the purpose of generating the object for the integration test.

3. The method according to claim 2, whereby the object to be tested is automatically brought into a status as required for the integration test, being brought thereinto by a constructor call upon employment of the source code and by copying data components.

4. The method according to any of claims 1–3, whereby a method call with which the object is tested is derived from the relationship structure for the testing of an object.

5. The method according to any of claims 1–3, whereby, when no object is identified that is dependent only on objects of the set of tested objects, then an object that is additionally dependent on optimally few untested objects is identified and tested.

6. The method according to claim 5, whereby an untested object is replaced by an object stub.

7. The method according to claim 5, said method being executed until an untested object is no longer present.

8. The method according to any of claims 1–3, whereby at least one of those objects that, due to the relationship structure, are only dependent on one another and not on objects of the set of tested objects, is replaced by an object stub in order to test another object.

9. An integration test method for a object-oriented computer program comprising the following steps:
   a) analyzing a source code for the object-oriented program to identify mutual dependencies between objects, such analysis being an analysis of structural relationships between said objects;
   b) identifying mutual dependencies between at least two objects and/or object classes by way of such analysis;
   c) identifying all objects that have not been tested and use only standard data types or objects that have already been tested and objects whose uses can only be tested in a common testing step;
   d) allocating to a set of tested objects any objects that have already been tested and variables of standard types;
   e) identifying at least one object by way of the structural relationship of the source code which is dependent only on objects of the set of tested objects; and
   f) testing uses of said object.

10. The method according to claim 9, whereby a correct constructor is automatically identified for testing an object with the source code and with the relationship structure, said constructor serving the purpose of generating the object for the integration test.

11. The method according to claim 9, whereby the object to be tested is automatically brought into a status as required for the integration test, being brought thereinto by a constructor call upon employment of the source code and by copying data components.

12. The method of claim 9, whereby a method call with which the object is tested is derived from the relationship structure for the testing of an object.

13. The method of claim 9, whereby, when no object is identified the is dependent only on objects of the set of tested objects, then an object that is additionally dependent on optimally few untested objects is identified and tested.

14. The method of claim 13, whereby an untested object is replaced by an object stub.

15. The method of claim 13, said method being executed until an untested object is no longer present.

16. The method of claim 9, whereby at least one of those objects that, due to the relationship structure, are only dependent on one another and not on objects of the set of tested objects is replaced by an object stub in order to test another object.

17. An integration test method for an object-oriented computer program whose objects have been tested previously, comprising the following steps:
   (a) conducting a source code analysis of a structural relationship between the previously tested objects in the object-oriented program;
   (b) identifying mutual dependencies between at least two objects and/or object classes by way of the source code analysis of the structural relationships of the object-oriented program;
   (c) allocating a tested object and/or an object derived from a tested class to a set of tested objects;
   (d) identifying at least one object with the assistance of the structural relationship of the source code, said at least one object being dependent only on objects on the set of tested objects; and (e) testing uses of said at least one described object.

18. An integration test method for an object-oriented program whose objects were previously tested, comprising the following steps executed automatically by a computer:

(a) conducting a source code analysis of a structural relationship between objects in the object-oriented program;

(b) identifying mutual dependencies between at least two objects and/or object classes by way of the source code analysis of the structural relationships of the object-oriented program;

(c) allocating a tested object and/or an object derived from a tested class to a set of tested objects;

(d) identifying at least one object with the assistance of the structural relationship of the source code, said at least one object being dependent only on objects of the set of tested objects; and (e) testing uses of said object.

19. The method according to claim 17, whereby a correct constructor is automatically identified for testing an object with the source code and with the relationship structure, said constructor serving the purpose of generating the object for the integration test.

20. The method according to claim 18, whereby the object to be tested is automatically brought into a status as required for the integration test, being brought thereinto by a constructor call upon employment of the source code and by copying data components.

21. The method according to any of claims 17–20, whereby, when no object is identified that is dependent only on objects of the set of tested objects, then an object that is additionally dependent on optimally few untested objects is identified and tested.

22. The method according to claim 21, whereby an untested object is replaced by an object stub.

23. The method according to any of claims 17–20, whereby at least one of those objects that, due to the relationship structure, are only dependent on one another and not on objects of the set of tested objects is replaced by an object stub in order to test another object.

24. The method according to claim 21, said method being executed until an untested object is no longer present.

25. An integration test method for an object-oriented computer program whose objects were previously tested, comprising the following steps executed by a computer:

(a) analyzing a source code for the object-oriented program to identify mutual dependencies between objects, such analysis being an analysis of structural relationships between said objects;

(b) identifying mutual dependencies between at least two objects and/or object classes by way of such analysis;

(c) identifying all objects that have not been tested and use only standard data types or objects that have already been tested and objects whose uses can only be tested in a common testing step;

(d) allocating to a set of tested objects any objects that have already been tested in variables of standard types;

(e) identifying at least one object by way of the structural relationship of the source code which is dependent only on objects of the set of tested objects; and (f) testing uses of said object.

26. The method according to claim 25, whereby a correct constructor is automatically identified for testing an object with the source code and with the relationship structure, said constructor serving the purpose of generating the object for the integration test.

27. The method according to claim 25, whereby the object to be tested is automatically brought into a status as required for the integration test, being brought thereinto by a constructor call upon employment of the source code and by copying data components.

28. The method of claim 25, whereby, when no object is identified that is dependent only on objects of the set of tested objects, then an object that is additionally dependent on optimally few untested objects is identified and tested.

29. The method of claim 28, whereby an untested object is replaced by an object stub.

30. The method of claim 28, said method being executed until an untested object is no longer present.

31. The method of claim 25, whereby at least one of those objects that, due to the relationship structure, are only dependent on one another and not on objects of the set of tested objects, is replaced by an object stub in order to test another object.

* * * * *